April 24, 1934.  J. E. TSAVARIS  1,956,479
VEHICLE SIGNAL SWITCH
Filed March 6, 1933  2 Sheets-Sheet 1
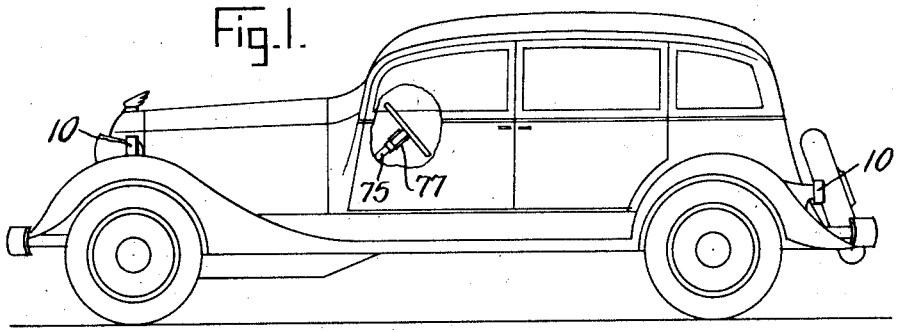
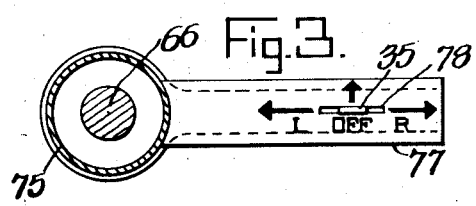
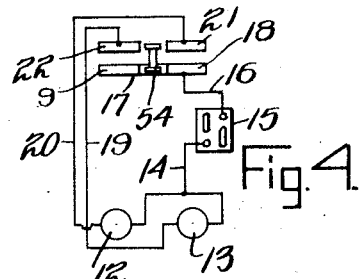
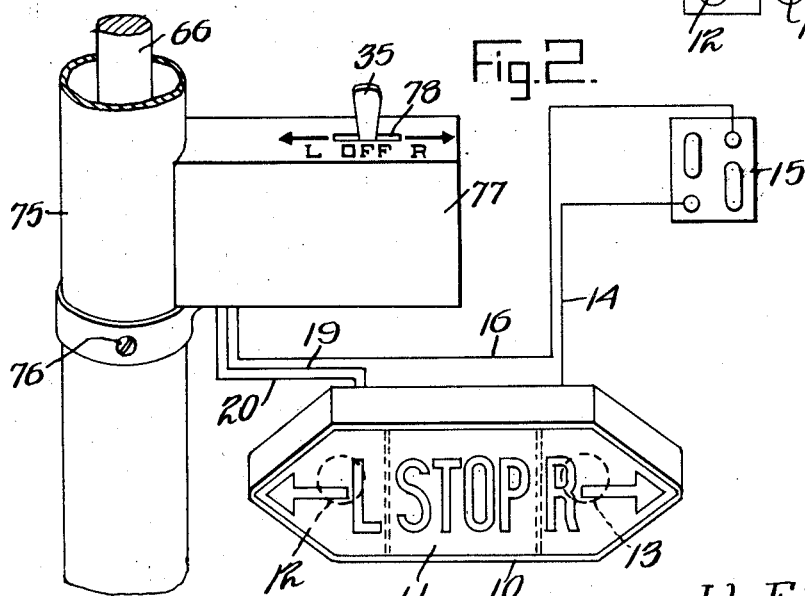
Inventor
John E. Tsavaris April 24, 1934.  J. E. TSAVARIS  1,956,479
VEHICLE SIGNAL SWITCH
Filed March 6, 1933  2 Sheets-Sheet 2
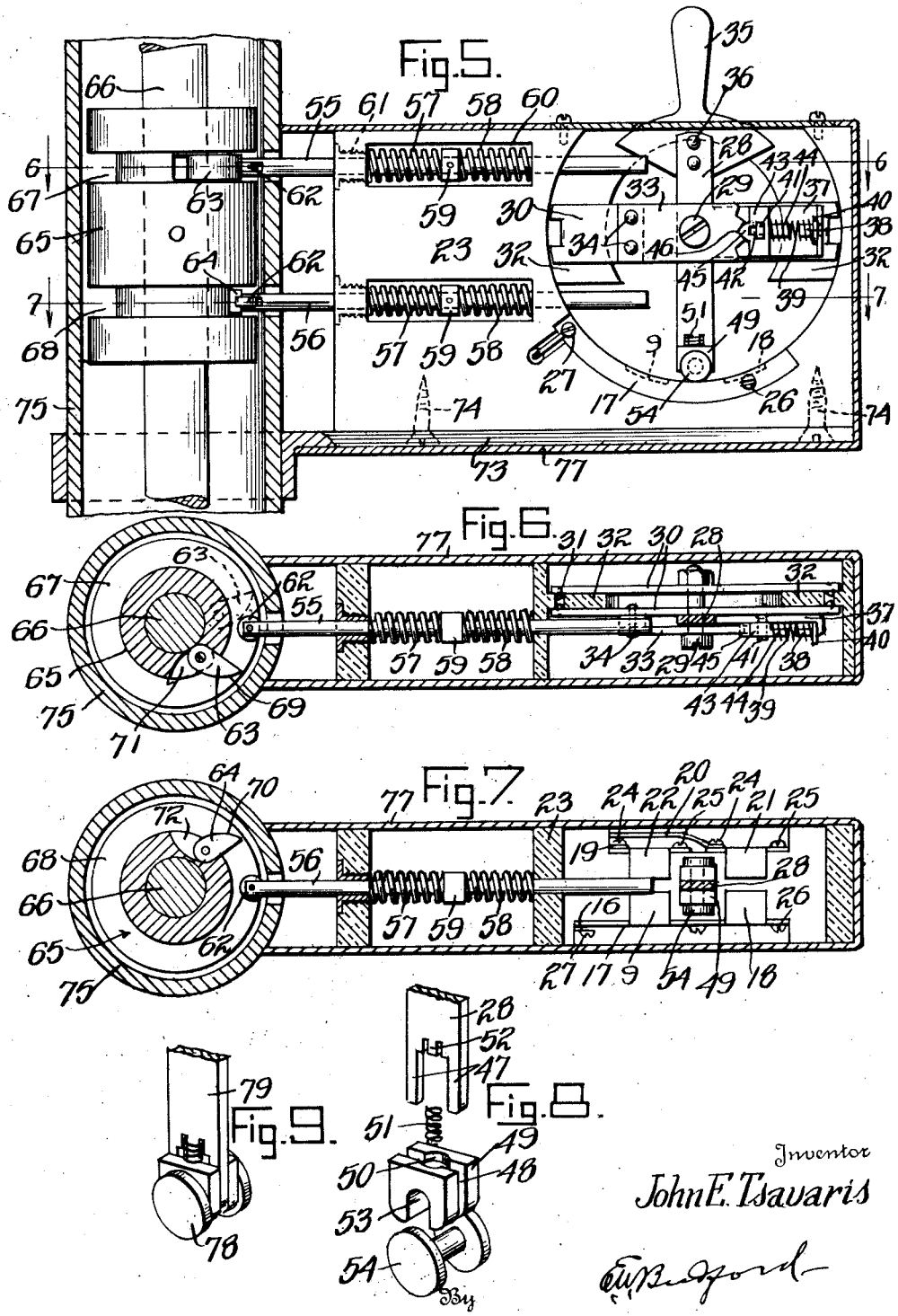

Patented Apr. 24, 1934

1,956,479

UNITED STATES PATENT OFFICE 1,956,479

VEHICLE SIGNAL SWITCH

John E. Tsavaris, Tarpon Springs, Fla.

Application March 6, 1933, Serial No. 659,891

3 Claims. (Cl. 200—59)

This invention relates to signal light switches for vehicles and particularly to signals for indicating the intended direction of any turning movement of the vehicle; and an object of the invention is to provide such a device which is not only of simple construction and easily operated but one which is automatically put out of operation after the vehicle has made the indicated turn; and which will also automatically correct any mistake as between the signal given and the turn made.

Further objects and advantages will become apparent from the description which follows.

Referring to the accompanying drawings, which are made a part hereof and on which similar reference characters indicate similar parts, Figure 1 is a side view of a motor vehicle having my device applied thereto, Figure 2, a view in elevation of a portion of the steering column of the vehicle showing my device attached thereto, Figure 3, a plan view of a portion of the parts shown in Figure 2, Figure 4, a diagrammatic view of portions of the device showing the control circuits, Figure 5, a vertical section showing details of the controlling switch for the device, Figure 6, a section on line 6—6 of Figure 5, Figure 7, a section on line 7—7 of Figure 5, Figure 8, a detail view of a contact making element of the control switch, and Figure 9, a modified form of contact making element shown in Figure 8.

In the drawings numeral 10 indicates a casing having a panel, one end of which panel is labeled "L" and the other "R" with arrows pointing to the left and to the right to indicate the direction which the operator is to turn. The panel is preferably made of translucent material such as glass or a composition and may be painted with the letters preferably colored red. Beneath the letters "L" and "R" are lamps 12 and 13 which are grounded by a common wire 14 with a battery 15 which may be and preferably is the battery on the car. The battery is connected by a wire 16 with a metallic bar 17 which has contact points 18 and 9. Lamps 12 and 13 are connected by wires 20 and 19 respectively with contact plates 21 and 22. Contact plates 21 and 22 are secured to an insulating switch block 23 by means of screws 24 and 25, screws 24 also serving as binding posts for securing the wires 20 and 19 to the contact plates 21 and 22. The metallic bar 17 is secured to the insulating block 23 by screws 26 and 27, the screw 27 serving also as a binding post for securing the wire 16 to the metallic bar 17. A switch for closing circuit across contacts 9 and 22 or 18 and 21 will now be described.

This switch consists of a switch lever 28 which is pivoted on a screw 29 carried by a pair of plates 30, on the ends of which are lug portions 31 which engage in sockets in ears or lugs 32, formed integral with the insulating switch block 23. The lever 28 is carried between the outer bar 30 and a short plate 33 which is rigidly secured to the bar 30 by means of pins, rivets or screws 34. The lever 28 has an extended portion 35 which may be made integral therewith or which may be attached thereto as shown by means of rivets 36. The switch lever 28 has an arm 37 preferably made integral therewith, the outer end of which arm is bent forward as shown in Figure 5 and has a lug portion 38 bent back parallel with the body of the arm 37. Positioned about this lug portion is a spring 39 which is seated against a washer 40. The arm 37 also has a lug 41 which preferably has an elongated head which may be passed through an elongated slot 42 in a dog 43. When the dog is in the position shown in Figure 5 the slot 42 and the head of the lug 41 will be approximately at right angles to each other whereby the head serves to hold the dog 43 on the arm 37. The dog 43 has a lug 44 around which seats one end of the spring 39. The dog 43 has also a projection 45 adapted to engage one of several notches 46 in the plate 33. When the switch lever 28 is in the neutral position as shown in Figure 5 the projection 45 will be seated in the central notch 46 being resiliently held therein by means of the spring 39. When the lever 28 is moved either to the right or to the left the projection 46 will ride up on the ridges on the bracket 30 and hold the lever 28 in the position to which it is moved.

The lower end of the lever 28 has forks 47 which engage slots 48 in the sides of an insulating block 49. This block has also a socket 50 in which one end of spring 51 seats, the other end of the spring being seated around a short lug 52 on the lower end of the switch lever 28. The lower side of the insulating block is notched at 53 to fit over the center of a contact roller 54. The ends of the roller 54, when moved to the right or to the left in Figure 5 close circuit across contacts 18—21 or 9—22 to close circuit from the battery 15 with one or the other of the lamps 12 or 13. The switch 28 is movable by the operator of the car and is moved to indicate the direction in which the car is about to turn. After the turn has been made it is desirable that the signal be automatically cut out. This is accomplished by means of rods 55 and 56 which are slidably mounted in the insulating block 23. These rods are held in a balanced position by means of springs 57 and 58. The inner ends of the springs bear against a collar 59 on the rod and the outer ends of springs 58 seat in the bottom of a slot 60. The outer ends of springs 57 seat against the inner ends of bushings 61 which are crewed in bores in the switch block 23. The outer ends of the rods 55 and 56 preferably carry rollers 62 which are engaged by dogs 63 and 64 pivotally secured upon a collar 65 which is attached to the steering rod 66 of the vehicle. The dogs 63 and 64 are positioned respectively in annular grooves 67 and 68 in the collar 65. The dogs 63 and 64 have cam surfaces 69 and 70 for engagement with the rollers 62 to operate the rods 55 and 56. The dogs 63 and 64 are pivoted so as to swing into and out of cut-out portions 71 and 72 in the collar 65. The upper dog 63, as will be apparent, is permitted to swing into the cut-out portion 71 when the steering rod is rotated in a counter-clockwise direction as shown in Figure 6. When rotated in this direction the dog has no effect upon the rod 55. When the steering rod is rotated in a clockwise direction the cam surface 69 will engage with the roller 62 and the dog will be moved to the position shown in full lines and in dotted lines in Figure 6. The dog cannot swing further so that the cam portion 69 engaging the roller 62 will move the rod 55 to the right. If the switch lever 22 is in the neutral position, as shown in Figure 5 movement of the rod 55 will not affect the switch. If, however, the upper end of the switch lever 28 is to the left and roller 54 is closing circuit across contact elements 18 and 21 then movement of the rod 55 to the right will engage the lever 28 and move it to the neutral position, the projection 45 of the dog 43 serving to stop the lever in neutral position. In the same manner the dog 64 will shove back the rod 56 only when the steering column is rotated in a counterclockwise direction. Movement of the rod 56 at this time will engage the lower end of the lever 28 only when this lower end is moved to a position at which contact is made between contact points 9 and 22.

Switch block 23 is preferably secured upon an arm 73 by means of screws or bolts 74. The arm 73 may be secured upon the steering column 75 by means of set screw 76. If desired a casing 77 may be positioned about the insulating block, this casing having a slotted portion 78 through which the upper end of the lever 35 extends. The top of the casing 77 will preferably have legends "R" and "L" and "OFF" indicating the right and left turn and the off position of the signal.

The modified form of the device shown in Figure 9 provides for a single wiring diagram. In this form of the device the contact making roller 78 is carried in a metallic block on the operating lever 79 which lever is grounded to the metallic frame work of the vehicle. The battery and the lights will likewise be grounded to the same metallic frame work. A suitably insulated operating handle not shown of course may be attached to the lever 79 if desired.

In operation when the driver of the vehicle contemplates making a right turn he moves the lever 35 to the right. This closes circuit across contact points 9 and 22 to close circuit to the light 13 which is positioned beneath the letter "R" in the signal case 19. This illuminates this letter and indicates that the vehicle is about to turn to the right. When the steering rod is rotated in a clockwise direction to make a right turn the rod 55 of course will be operated by the dog 63. This, however, will not affect the switch lever 28. The operator may continue to rotate the steering rod in this direction without affecting the signal light. As soon, however, as the steering rod is rotated in the opposite direction or counterclockwise the dog 64 will engage and operate the rod 56. The right end of this rod engages the lower end of the lever 28 to cut out the signal light 13. In making a left turn of course it is obvious that the lever 35 will be moved to the left and turning of the steering rod to the left will not affect the light beneath the letter "L" but this light will be extinguished as soon as the steering rod has been rotated clockwise to bring the car into its normal forward position.

It may be that the operator becoming confused will move the lever 35 to the right to indicate a right turn when he really means to make a left turn. If he does do this and starts to make a left turn, the right turn signal will at once be cut out indicating to any one at the rear of the vehicle that the operator is not making a right turn and thus put him on guard to keep his car in control until he learns what the driver intends to do.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In combination with the steering rod of a vehicle having a collar provided with vertically spaced radial grooves formed therein, one-way dogs pivoted in said grooves, a control switch comprising a casing, a switch lever pivoted in said casing, contacts in said casing adapted to be connected by said switch lever, vertically spaced spring-pressed plungers positioned on opposite sides of the pivot point of said lever with the ends thereof in close proximity to the ends of said lever and the opposite ends projecting into said grooves, said dogs being adapted to actuate the plungers upon movement of said steering rod in a direction opposite to that of a turn made by the vehicle to return said switch lever to neutral position, substantially as set forth.

2. In a device having lights for indicating the direction which a vehicle is about to turn, a switch for controlling each of the lights separately, said switch comprising a casing mounted on the steering post, contacts in said casing, a switch lever pivoted in said casing adapted to be moved to bridge said contacts, said lever being provided with an operating handle, vertically spaced plungers positioned on each side of the pivotal point of said switch lever with the ends thereof in close proximity to the ends of said lever for moving said lever to neutral position and vertically spaced means pivoted on the steering rod adapted to engage the other ends of said plungers to actuate said plungers when the steering rod is rotated in a direction opposite to that in making a turn, substantially as set forth.

3. A signal control switch for vehicle steering mechanism comprising a support mounted on the steering post, contacts on said support, a switch lever pivoted on said support for bridging said contacts normally positioned parallel to the steering rod, vertically spaced plungers positioned on said support between said lever and the steering rod and vertically spaced dogs pivoted on the steering rod adapted to actuate said plungers to move said lever to neutral position upon movement of the steering rod in a direction opposite to that in making a turn, substantially as set forth.

JNO. E. TSAVARIS.